H. L. Kendall.
Wood Screws.
N° 24,393.   Patented Jun. 14, 1859.

Witnesses
Wm H Henderson
Nicholas Sheldon

Inventor
Henry L Kendall

UNITED STATES PATENT OFFICE.

HENRY L. KENDALL, OF PROVIDENCE, RHODE ISLAND.

IMPROVEMENT IN WOOD-SCREWS.

Specification forming part of Letters Patent No. 24,393, dated June 14, 1859.

*To all whom it may concern:*

Be it known that I, HENRY L. KENDALL, of the city and county of Providence, in the State of Rhode Island, have invented a new and useful Improvement in Wood-Screws, which I call the "Ratchet-Screw," and of which the following is a full, clear, and exact description, reference being had to the annexed drawings, making part of this specification, in which—

Figure 1:
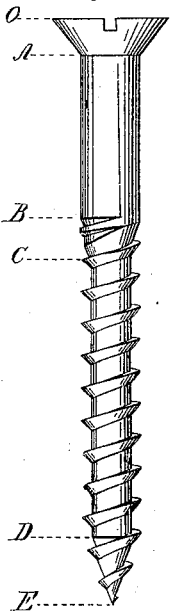
Figure 2:
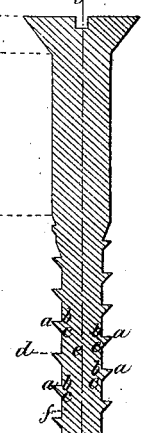
Figure 4:
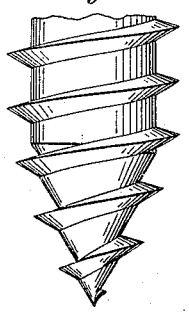
Figure 5:
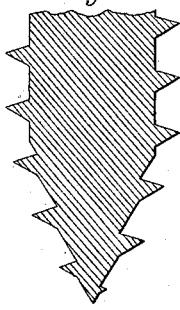
Figure 6:
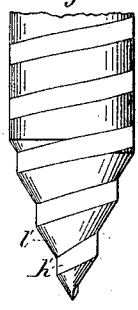
Figure 7:
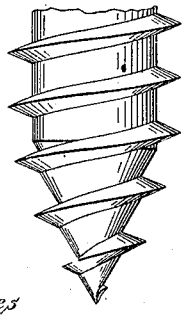
Figure 8:
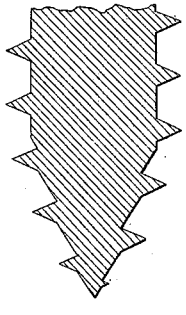
Figure 9:
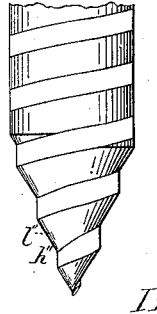

Figure 1 represents a side view of a screw whose thread is of this ratchet form. Fig. 2 represents a section of the same made by a plane passing through its axis, and Fig. 3 a side view of the solid core of the same, the thread having been stripped off. Fig. 4 represents a side view of another ratchet-screw slightly varied in the form of its thread. Fig. 5 represents a section of the same made by a plane passing through its axis, and Fig. 6 a side view of the solid core of the same, the thread having been stripped off. Fig. 7 represents a side view of a screw with a thread of the common form and disposed upon the stem in the ordinary way. Fig. 8 represents a section of the same made by a plane passing through its axis, and Fig. 9 a side view of the solid core of the same, the thread having been stripped off.

The unthreaded part of a wood-screw, from O to A, Fig. 1, I term the "head;" that part next the head (from A to B) I term the "shank;" the cylindrical part of the threaded portion, (from C to D,) the "stem" or "body;" the part from B to C, (by which the stem is united to the shank,) the "shoulder," and the part from D to E, (in which the stem terminates,) the "point." That side of the convolution of the thread next the head of the screw I call the "top" or "upper" surface or side, and that side of the thread next the point of the screw I call the "bottom" or "under" surface or side. A wood-screw holds in the wood into which it is screwed by the bearing of the upper sides of its threads against the lower sides of threads formed in the wood by the compression of the fibers of the wood produced by turning the screw into it. As wood is a weaker material than the metals of which screws are formed, it is customary to make the metallic thread of considerably less dimensions than the spaces between its convolutions, that the thread in the wood, which is the counterpart of the spaces between the convolutions of the metal thread, may be as strong, or thereabout, as the thinner metal thread of the screw.

My improvement relates to that class of wood-screws which have threaded points to facilitate entering them into wood without previous boring. Wood-screws with threaded points have long been known, and both the thread and the body of such screws between the convolutions of the thread have been made of various shapes and proportions. In some cases the form and proportion of the thread of the screw have been such as to give it great strength, but with the disadvantage of leaving too little space between its convolutions to give it sufficient hold upon the wood. In other cases the thread has been so shaped that its upper side bore with such a degree of obliquity upon the wood as tended to compress and wedge out the thread of the wood and enlarge the hole, so as to permit the screw to be drawn out by a force insufficient to break its hold in the wood if the upper surface of its thread had borne more directly against the under surface of the wood thread. Again, the thread of the screw has been made of a form that gave its upper side a good hold of the wood, but with its under side sloping nearly or quite across the space between its adjacent convolutions, leaving a large surface upon which the fiber of the wood constantly presses in a direction in which the wood possesses the most elasticity, and which therefore bears or rubs hard upon the screw, increasing the friction and rendering the screw harder to turn into the wood, and more liable to be broken in entering. Screws have also been made with very deep and narrow threads, leaving ample space between their convolutions to give the requisite strength to the threads in the wood; but such screw-threads are difficult to make and liable to have their connection with the stem of the screw ruptured in the process of making, so that when a strain comes upon such a screw, especially in entering its point, its thread is often stripped off. But for these objections this form of screw-thread would be preferable to most of the others.

It is the object of my improvement to avoid or to remedy the defects of previous screws, while retaining their good qualities; and my invention consists in making the thread of the screw in such manner that its upper side in any straight line running across it from the axis of the screw shall be at right angles to that axis, as at *a b* or *d e*, Fig. 2, and making the lower side of the thread, as at *a c*, inclined to the upper side barely enough to give to the thread the thickness requisite for strength, so that the bearing of the top of the thread of the screw upon the under side of the thread of the wood will be at right angles to the axis of the screw and to the direction of any force tending to draw the screw out of the wood. This form of thread applied to the point of the screw, as shown in Figs. 1 and 2, greatly facilitates the entering of the screw into the wood without previous boring, from the stronger grasp which the ratchet-thread takes upon the wood, and I therefore deem this form of thread for the point an important improvement, even if the thread on the stem above the point were of some other form. Moreover, I deem it of great importance to make the upper surface of the thread less inclined to the axis than the under side when it is not convenient or for any reason not expedient to construct it at right angles to the axis, which I consider the best form; and a screw can be made embodying a large share of the advantages of the best mode of applying my invention by making the upper side of the thread to incline to the axis (radially) about half as much as in ordinary wood-screw threads, and increasing in a corresponding degree the inclination of the under side of the thread, so as to give the thread a base of the same width and the same strength as when it is made of the ordinary form with its upper and under sides equally inclined to the axis. A screw thus formed is shown in Figs. 4, 5, and 6 of the drawings.

Heretofore the points of pointed wood-screws intended to be turned into wood without first boring a hole in which to enter them have been made, or proposed to be made, upon plans radically defective. One plan, and the most common one, is to make the thread of diminishing depth on the upper side from the lower end of the stem to the apex of the point, while the full depth of the thread is maintained on the under side until it reaches the apex. This form of thread is defective, because the under and larger surface of the thread resists the entrance of the screw into the wood, while the diminished hold which the narrow upper surface has of the wood is often insufficient to overcome this resistance, and consequently the thread of the wood is liable to be torn out. Such threads are usually placed between and made to stand upon both the adjacent (upper and lower) margins of the adjacent convolutions of a narrow inclined plane equal in width to the pitch of the thread, commencing at the axis and winding in a helical and spiral path until it reaches the circumference of the stem or cylindrical portion of the body of the screw, into which it merges. The term "inclined plane," applied to such a helical and spiral path, I herein use as referring to the progressive increase of its distance from the axis of the screw as traced in the direction of a circumference leading from the apex toward the base of the point.

My improved screw differs from that last mentioned in placing the thread wholly upon the same convolution of an inclined plane, so that the thread is of the same depth on both its upper and under sides, and instead of forming the point by a single inclined plane (gradually rising from the axis to the circumference of the cylinder) and bridging, so to speak, the spaces between the convolutions of the inclined plane by the thread I form the point by two inclined planes, one (see *h*, Fig. 3; *h'*, Fig. 6, and *h''*, Fig. 9) for the thread to stand on, having its surface (in any line of any plane of the axis) parallel to the axis and winding spirally and helically round the same, and bridging the spaces between the convolutions of such inclined plane by another inclined plane, (see *l*, Fig. 3; *l'*, Fig. 6, and *l''*, Fig. 9,) whose surface (in any plane of the axis) is oblique to the axis of the screw and whose edges join the edges of the first-named plane. This construction gives to the profile of the point when the thread is stripped off somewhat the appearance of a pyramid encircled by a slant path or steps winding spirally from the base to the apex. The last convolution next the apex of both the inclined planes and of the thread narrows rapidly toward the apex; but the remainder of the convolutions of the thread on the point are of the same width (measuring perpendicularly between radii at right angles to the axis passing through the angles of adjacent convolutions of the thread in any plane of the axis of the screw) and depth as those upon the stem between the point and the shoulder.

Figure 3:
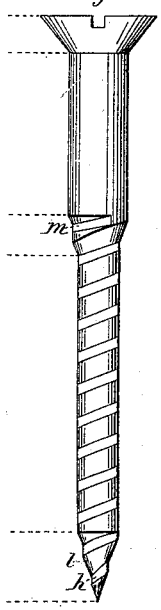

The thread stands upon the shoulder, as it does upon the point, on an inclined plane *m*, Fig. 3, parallel to the axis of the screw, which gradually rises from the surface of the stem to the surface of the shank, the thread gradually diminishing in depth as it rises on the shoulder until it runs out at the surface of the shank, and the inclined plane which joins the edges of adjacent convolutions of the inclined plane on which the thread stands also winds round the shoulder, gradually rising from the stem to the shank until it runs out at the surface of the latter. The thread stands on the shoulder, as seen in profile, apparently on a series of steps running parallel to the axis and rising from the circumference of the stem to the circumference of the shank.

As the machinery for fabricating the ratchet-screws herein described forms no part of the invention which I claim under this patent, it is unnecessary here to describe it, especially as any machinist skilled in making wood-screws could make screws of the form herein claimed from the instructions contained in the foregoing description.

I do not confine myself to the application of the ratchet-tooth thread to a screw whose point appears when seen in section or profile to approach the axis like a series of steps, as this form of thread is equally applicable to any other form of tapering point; but—

What I claim under this patent as my invention is—

1. A wood screw having a thread of a ratchet-tooth shape, in combination with wide spaces between the convolutions thereof on a stem cylindrical, or nearly so, and on a point of any suitable form, substantially as herein set forth.

2. Making the threaded point of a wood-screw in such manner that the thread thereof, except the terminal convolution, shall be of the same or nearly the same depth on its upper and lower sides to give the screw a firmer hold of the wood, especially on its first entrance, than it would have if the threads on the point were made of gradually less depth toward the apex, substantially as herein set forth.

3. So forming the thread of a wood-screw that it shall be of the same depth on the upper and under side on the point and on the stem, except the terminal convolution of the point, which is contracted rapidly in depth and width, substantially as herein set forth.

In testimony whereof I have hereunto subscribed my name.

HENRY L. KENDALL.

Witnesses:
HENRY BALDWIN, Jr.,
A. E. H. JOHNSON.